(12) United States Patent
Matsushita et al.

(10) Patent No.: US 7,050,231 B2
(45) Date of Patent: May 23, 2006

(54) FARADAY ROTATOR WITH METAL REFLECTION FILM

(75) Inventors: Takeshi Matsushita, Iwata-gun (JP); Mitsuteru Inoue, Okazaki (JP); Hideki Kato, Iwata-gun (JP); Akio Takayama, Iwata-gun (JP)

(73) Assignee: Minebea Co., Ltd., Kitasaku (JP)

( * ) Notice: Subject to any disclaimer, the term of this patent is extended or adjusted under 35 U.S.C. 154(b) by 128 days.

(21) Appl. No.: 10/105,438

(22) Filed: Mar. 26, 2002

(65) Prior Publication Data

US 2002/0139974 A1    Oct. 3, 2002

(30) Foreign Application Priority Data

Mar. 30, 2001    (JP) .............................. 2001-100925

(51) Int. Cl.
G02B 27/28    (2006.01)
G02B 5/30    (2006.01)

(52) U.S. Cl. ...................... 359/494; 359/280; 359/282; 359/324; 385/11

(58) Field of Classification Search ........ 359/280–283, 359/324, 483, 494, 500, 484, 498; 369/112; 385/11

See application file for complete search history.

(56) References Cited

U.S. PATENT DOCUMENTS

| | | | | |
|---|---|---|---|---|
| 4,195,908 A | * | 4/1980 | Kestigian et al. | 359/484 |
| 4,525,028 A | * | 6/1985 | Dorschner | 359/484 |
| 5,521,759 A | * | 5/1996 | Dobrowolski et al. | 359/585 |
| 5,920,420 A | * | 7/1999 | Ishikura et al. | 359/282 |
| 5,920,538 A | * | 7/1999 | Il'Yashenko | 369/112 |
| 6,952,300 B1 | * | 10/2005 | Levy | 359/280 |
| 2005/0018327 A1 | * | 1/2005 | Okubo et al. | 359/883 |

* cited by examiner

Primary Examiner—Leonidas Boutsikaris
(74) Attorney, Agent, or Firm—Oliff & Berridge, PLC

(57) ABSTRACT

A Faraday rotator of multilayer film type is provided which can achieve excellent optical characteristics with a reduced number of layers. In the Faraday rotator, a metal reflection film, a periodic dielectric multilayer film made of silicon dioxide $SiO_2$ and tantalum pentoxide $Ta_2O_5$, a magneto-optical thin film, and another periodic dielectric multilayer film made of tantalum pentoxide $Ta_2O_5$ and silicon dioxide $SiO_2$ is formed sequentially. Light incident on a polarizer goes therethrough, is reflected at the metal reflection film while traveling trough the periodic dielectric multilayer films, and goes through an analyzer to exit out.

7 Claims, 7 Drawing Sheets

FARADAY ROTATOR WITH METAL REFLECTION FILM

BACKGROUND OF THE INVENTION

1. Field of the Invention

The present invention relates to a Faraday rotator constituting an optical isolator and an optical circulator used for optical-fiber communication, optical recording, optical measuring system, etc.

2. Description of the Related Art

In optical-fiber communications systems using semiconductor lasers as light sources, especially in optical systems by the high-speed digital transmission and the analog direct modulation method, when reflected light from optical connector junctions, optical circuit components, etc. used in optical-fiber circuits returns toward the semiconductor lasers or optical amplifiers, frequency characteristics are degraded and noises are generated, giving difficulty to the high quality transmission. Optical isolators are used to eliminate the reflected light.

As shown in FIG. 10, a conventional optical isolator is composed of a polarizer 6 and an analyzer 5 both adapted to allow only light with a specific plane of polarization to pass therethrough, a Faraday rotator 4 comprising a substrate (transparent) 1' and a laminate film 3 formed thereon and adapted to rotate the plane of polarization of light by 45 degrees, and a permanent magnet (not shown) for applying a magnetic field to the Faraday rotator. The performance of the optical isolator depends primarily on the Faraday rotator 4 among the constituents thereof. It is important for the Faraday rotator to have a small length of an element required for rotating the plane of polarization by 45 degrees and a high light transmittance.

Hitherto, a bulk single crystal (thickness of about 2 mm) of yttrium iron garnet (YIG) and a thick film single crystal (thickness of several hundred μm) of bismuth-substituted rare-earth iron garnet (BiYIG), in which bismuth having a large magneto-optical performance index substitutes for part of yttrium, have been used as the Faraday rotator. Recently, a BiYIG thick film single crystal advantageous in downsizing the optical isolator is often used. This thick film single crystal is produced by a liquid phase epitaxial growth method, in which many production parameters must be precisely controlled to realize a stable epitaxial growth, making it difficult to grow a homogeneous single crystal over a large area at a high yield. Furthermore, since it takes 20 hours or more to grow the crystal, and since an expensive non-magnetic gadolinium gallium garnet (GGG) single crystal substrate is required as the substrate, the cost reduction has been hindered.

Under these circumstances, in order to solve the problems of magneto-optical members produced by the aforementioned liquid phase epitaxial growth method, the inventors of the present invention have suggested a magneto-optical member (Faraday rotator) made of one-dimensional magneto-photonic crystal that brings about the enhancement of a magneto-optical effect due to the localization of light. The magneto-optical member is a polycrystal with a thickness of several μm, but can achieve a large Faraday rotation angle.

The aforementioned one-dimensional magnetic photonic crystal is described in detail in Japanese Patent Application No. 11-283512 filed by the inventors of the present invention, and in Journal of Magnetics Society of Japan 23, 1861–1866 (1999). The one-dimensional megneto-photonic crystal is configured such that magnetic layers and dielectric layers, each layer having an irregular thickness, are formed into a multilayer film, or configured so as to comprise two dielectric multilayer films made of dielectric members having regular thicknesses and alternately laminated, and an irregular layer (defective layer) made of magnetic member.

In particular, the latter has the same structure as a long-known Fabry-Perot resonator structure, and has been known to achieve a large enhancement with a film configuration that can be manufactured easily. While $(Ta_2O_5/SiO_2)$-system is generally used as the dielectric member constituting a dielectric multilayer film to serve as a reflecting mirror for the Fabry-Perot resonator, $(Si/SiO_2)$-system, which can achieve a large Faraday rotation angle with a smaller number of layers compared with the $(Ta_2O_5/SiO_2)$-system, has also been suggested. The film thickness of each dielectric member must be designed such that the optical length (optical path length×refractive index) is equal to $\lambda/4$ ($\lambda$: the wave length of light). The optical length of an irregular layer (defective layer) made of a magnetic member to localize light is generally set to $m\lambda/2$ (m: an integer).

However, it is known that the Faraday rotator with the Fabry-Perot resonator structure has a trade-off relationship between the Faraday rotation angle and the light transmittance, and that when the Faraday rotation angle is increased to 45 degrees (or −45 degrees), which is necessary for the optical isolator, the transmittance is reduced to about 50%. 50% of light, that is not transmitted, is reflected at the multilayer film and returns toward the light source, which is very disadvantageous because an optical isolator is used to block returning light. Furthermore, the reduction of the amount of outgoing light leads to the reduction of the light transmission distance, making it difficult to build an optical transmission system.

The inventors of the present invention conducted researches for improvement of transmittance by changing film configurations, and it was found out that a configuration, in which two Fabry-Perot resonators were jointed so as to sandwich therebetween a dielectric thin film having an optical length of $\lambda/4+m\lambda/2$ (m: 0 or a positive integer) (hereafter referred to as D. H. W. (Double Half Wave) structure), is effective in improving the transmittance. As is disclosed in detail in Japanese Patent Application No. 2000-274936, when the film configuration is $(Ta_2O_5/SiO_2)^8/BiYIG/(SiO_2/Ta_2O_5)^8/SiO_2/(Ta_2O_5/SiO_2)^8/BiYIG/(SiO_2/Ta_2O_5)^8$, the transmittance and the respectively, at a Faraday rotation angle of 45 degrees, which causes no practical problems.

Although compatibility between the transmittance and the Faraday rotation angle can be achieved by adopting the D. H. W. structure, the D. H. W. structure comprises as many as 67 lamination layers and also has 2 magneto-optical thin films (BiYIG) which need a heat treatment, whereby the process for manufacturing the laminate film is complicated putting limitation to a reduction in the manufacturing cost. Furthermore, there is a problem that when an element is manufactured with an optical length differing from a designed value, reflected light to return toward the light source is generated.

SUMMARY OF THE INVENTION

Accordingly, it is an object of the present invention to provide a Faraday rotator of multiplayer film type which has only one magneto-optical thin film (BiYIG) that needs a heat treatment, and which utilizes reflected light as outgoing light to achieve excellent optical characteristics with a reduced number of layers.

In order to achieve the aforementioned object, according to a first aspect of the present invention, in a Faraday rotator comprising a laminate film including at least one kind of magneto-optical thin film, a metal reflection film is formed on a top or bottom surface of the laminate film.

According to a second aspect of the present invention, in the Faraday rotator of the first aspect, preferably, the laminate film includes one magneto-optical thin film and two periodic dielectric multilayer films, in each of which two kinds of dielectric thin films having refractive index different from each other are alternately laminated, and is configured such that the two periodic dielectric multilayer films sandwich the magneto-optical thin film with their lamination patterns being symmetric with respect to the magneto-optical thin film, and the metal reflection film is formed on a surface of one periodic dielectric multilayer film of the two opposite to a surface fronting the magneto-optical thin film.

According to a third aspect of the present invention, in the Faraday rotator of the first aspect, preferably, the laminate film includes one magneto-optical thin film, two periodic dielectric multilayer films, in each of which two kinds of dielectric thin films having refractive index different from each other are alternately laminated, and a dielectric thin film having a low refractive index, and is configured such that the magneto-optical thin film is arranged between the two periodic dielectric multilayer films, and that the dielectric thin film having a low refractive index is formed on a top or bottom surface of one periodic dielectric multilayer film of the two located closer to the metal reflection film, and the metal reflection film is arranged to front a surface of the one periodic dielectric multilayer film opposite to a surface fronting the magneto-optical thin film.

According to a fourth aspect of the present invention, in the Faraday rotator of the third aspect, preferably, the dielectric thin film having a low refractive index is arranged between the magneto-optical thin film and the periodic dielectric multilayer film located closer to the metal reflection film when the two periodic dielectric multilayer films are each configured such that a dielectric thin film having a higher refractive index of the two kinds (hereinafter referred to as higher-refractive dielectric thin film) fronts the magneto-optical thin film.

According to a fifth aspect of the present invention, in the Faraday rotator of the third aspect, preferably, the dielectric thin film having a low refractive index is arranged between the metal reflection film and the periodic dielectric multilayer film located closer to the metal reflection film when the two periodic dielectric multilayer films are each configured such that a dielectric thin film having a lower refractive index of the two kinds (hereinafter referred to as lower-refractive dielectric thin film) fronts the magneto-optical thin film.

According to a sixth aspect of the present invention, in the Faraday rotator of the fifth aspect, preferably, the dielectric thin film having a low refractive index arranged between the metal reflection film and the periodic dielectric multilayer film has an optical length ranging from $\lambda/8$ to $\lambda/3$ ($\lambda$: a wave length of light).

According to the present invention, a Faraday rotator of multilayer film type is realized which can achieve excellent optical properties with a reduced number of layers and only one magneto-optical thin film that needs a heat treatment. Furthermore, since reflected light is utilized, no light returns toward the light source even when the laminate film is manufactured with an optical length of each layer deviating from a designed value. In addition, the total number of layers can be reduced, and the outgoing light ratio can be improved without degrading the Faraday rotation angle.

DESCRIPTION OF THE PREFERRED EMBODIMENTS

In each of the embodiments described below, bismuth-substituted rare-earth iron garnet (BiYIG, refractive index: 2.36) is used as a magneto-optical thin film, tantalum pentoxide ($Ta_2O_5$, refractive index: 2.14) is used as a higher-refractive dielectric thin film, silicon dioxide ($SiO_2$, refractive index: 1.42) is used as a lower-refractive dielectric thin film and is laminated on the $Ta_2O_5$ film thereby forming a bilayer and ultimately constituting a periodic dielectric multilayer film, and aluminum (Al) (refractive index: 1.71, extinction coefficient: 10.7) is used as a metal reflection film. The wave length $\lambda$ of light is 1,300 nm.

Figure 1:
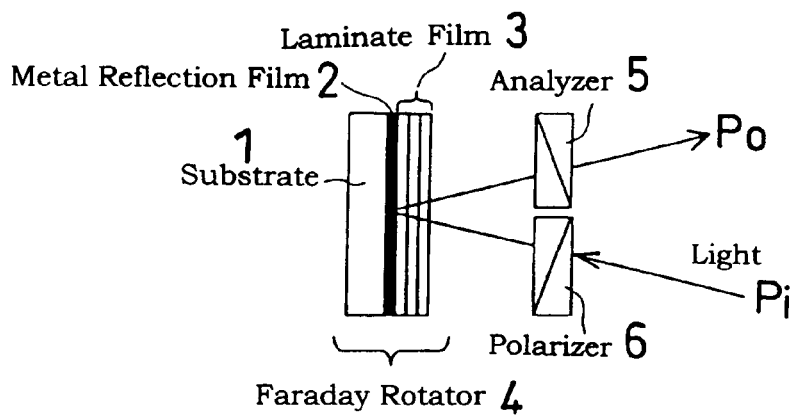
FIG. 1 shows an optical isolator including a Faraday rotator according to the present invention.

In FIG. 1, incoming light Pi is made incident on a polarizer 6, is reflected and rotated by a Faraday rotator 4 at a predetermined Faraday rotation angle, and goes through an analyzer 5 to exit out as outgoing light Po. The Faraday rotator 4 is structured such that a laminate film 3 is formed on a metal reflection film 2 formed on a substrate 1. The present invention will be described below in detail with reference to FIG. 2 to FIG. 9.

Figure 2:
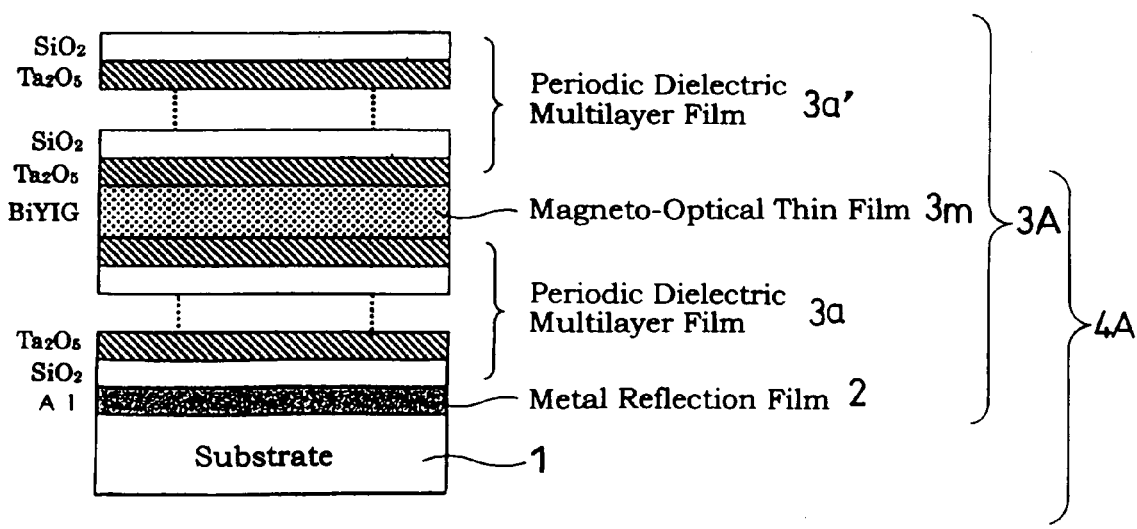
FIG. 2 shows a film configuration of a Faraday rotation according to a first embodiment of the present invention.

In a first embodiment of the present invention, as shown in FIG. 2, the Faraday rotator has a film configuration $(SiO_2/Ta_2O_5)^X/BiYIG/(Ta_2O_5/SiO_2)^X/Al$, where X denotes the number of repetition of bilayers constituting each of the periodic dielectric multilayer films. To be specific, a metal reflection film 2 is formed on a substrate 1, one periodic dielectric multilayer film 3a comprising a plurality (X) of bilayers each consisting of silicon dioxide $SiO_2$ and tantalum pentoxide $Ta_2O_5$ is formed on the metal reflection film 2 with $SiO_2$ in touch therewith, a magneto-optical thin film 3m is formed on the one periodic dielectric multilayer film 3a, and another periodic dielectric multilayer film 3a' including a plurality (X) of bilayers each consisting of tantalum pentoxide $Ta_2O_5$ and silicon dioxide $SiO_2$ is formed on the magneto-optical thin film 3c with $Ta_2O_5$ in touch therewith.

Figure 4:
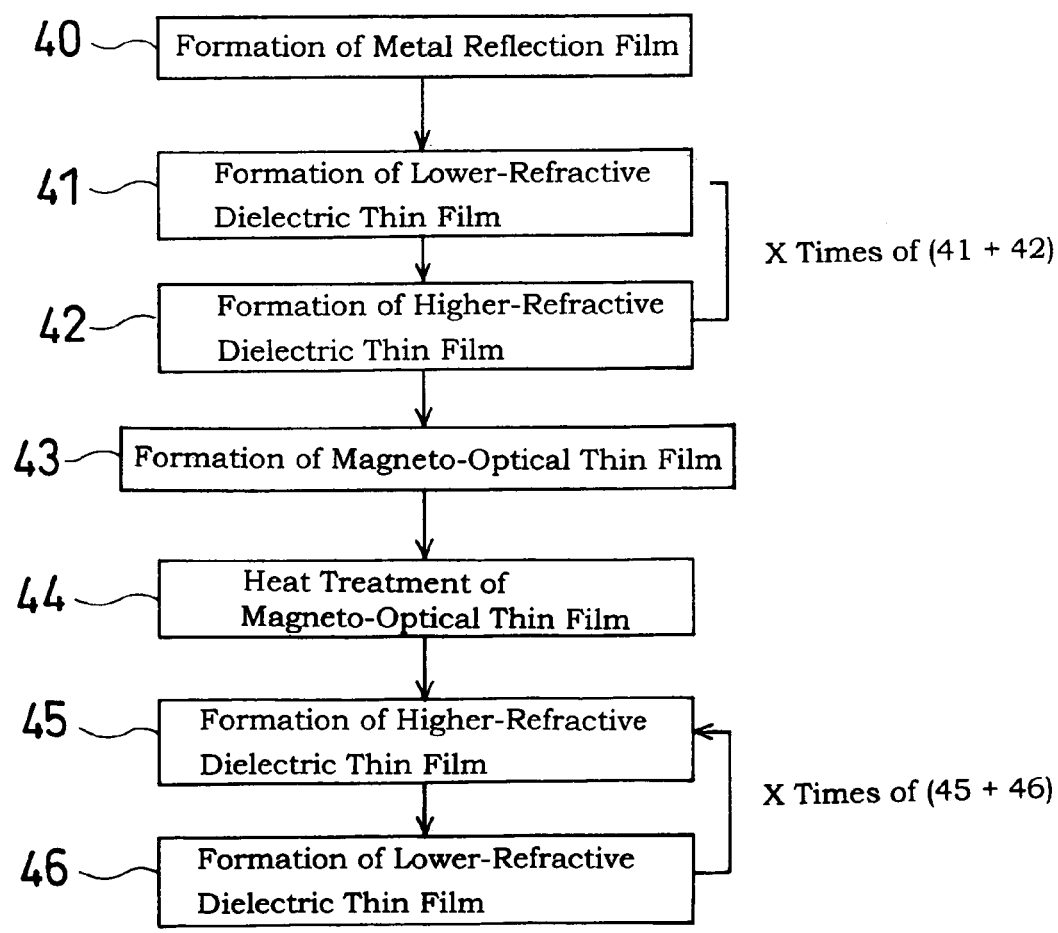
FIG. 4 shows a process of manufacturing the Faraday rotator according to the first embodiment of the present invention.

A process of manufacturing a Faraday rotator 4A shown in FIG. 2 will be described below with reference to FIG. 4. Aluminum (Al) is formed into a film with a thickness of 100 nm or more on the substrate 1 (Step 40), thereby constituting the metal reflection film 2. Since light is reflected by Al of the metal reflection film 2, the substrate 1 does not have to be transparent. Here, thin film forming techniques, such as sputtering and vapor deposition, can be applied.

A lower-refractive dielectric thin film $SiO_2$ having an optical length of $\lambda/4$ is formed on the metal reflection film 2 taking the incidence angle of light into account (Step 41), and a higher-refractive dielectric thin film $Ta_2O_5$ having an optical length of $\lambda/4$ is formed on the thin film $SiO_2$ (Step 42). By conducting the steps 41 and 42 alternately X times each, the one periodic dielectric multilayer film 3a of $(Ta^2O_5/SiO_2)^X$ as one reflecting mirror in a Fabry-Perot resonator is produced.

Then, bismuth-substituted rare-earth iron garnet (BiYIG) constituting the magneto-optical thin film 3m having an optical length of $\lambda/2$ is formed on the one multilayer film 3a of $(Ta_2O_5/SiO_2)^X$ (Step 43). Also here, thin film forming techniques, such as sputtering and vapor deposition, can be applied, but the composition of the magneto-optical thin film must be controlled precisely in order to achieve a desired Faraday effect.

When the magneto-optical thin film 3m is formed of bismuth-substituted rare-earth iron garnet (BiYIG), it gets an amorphous structure at the step 43 and does not have magnetism, so a high-temperature heat treatment is performed (Step 44) so as to make crystallization happen. The heat treatment may be performed using a common electric furnace depending on the combination of dielectric thin films of two kinds and a heat treatment temperature, and if problems are caused by irregularities of the multilayer film configuration and the metal reflection film accompanying the heat treatment, an infrared beam heating apparatus may be used which was invented by the inventors of the present invention and disclosed in Japanese Patent Application No. 11-283512.

Next, another periodic dielectric multilayer film 3a', that works as the other reflecting mirror, is formed on the magneto-optical thin film 3m in a reverse order to the steps 41 and 42 (Steps 45 and 46). To be specific, a higher-refractive dielectric thin film $Ta_2O_5$ having an optical length of $\lambda/4$ is formed first (Step 45), then a lower-refractive dielectric thin film $SiO_2$ having an optical length of $\lambda/4$ is formed thereon (Step 46). By conducting the steps 45 and 46 alternately X times each, the another periodic dielectric multilayer film 3a' of $(SiO_2/Ta_2O_5)^X$ is produced. The member produced by the aforementioned process is cut to a predetermined size using a dicing machine, etc., thereby completing the Faraday rotator 4A.

Figure 3:
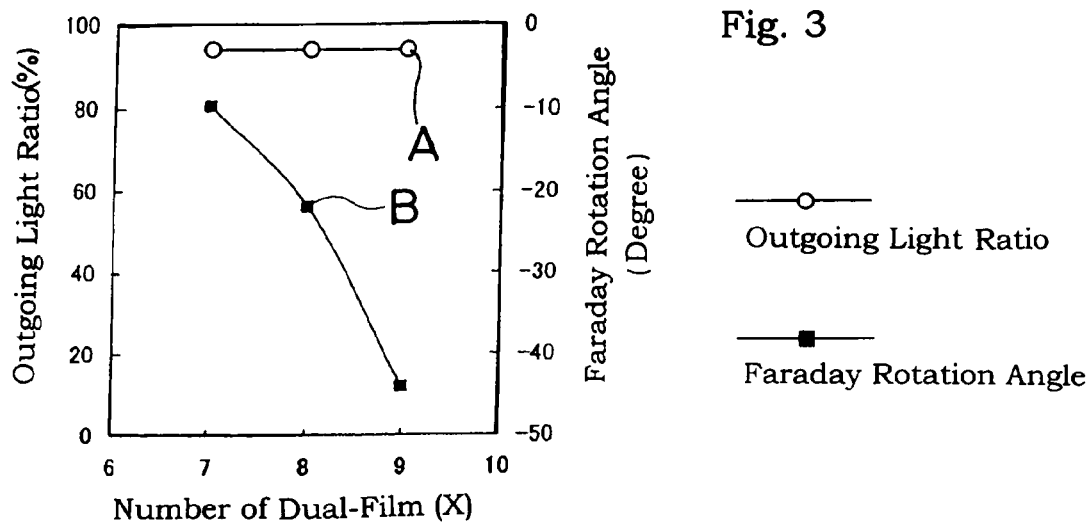
FIG. 3 shows an effect of the number of repetition of bilayers (X) on magneto-optical characteristics in the Faraday rotator according to the first embodiment.

In FIG. 3, the left axis of ordinates indicates an outgoing light ratio (A) ((amount of light outgoing from the Faraday rotator/amount of light incident on the Faraday rotator)× 100) %, the right axis of ordinates indicates a Faraday rotation angle (B), and the axis of abscissas indicates the number of repetition of bilayers (X). It is shown that when the number (X) is specified to be 9, an outgoing light ratio of 94% and a practicable Faraday rotation angle of −45 degrees can be achieved. The remaining 6% of light is absorbed by the metal reflection film with 0% returning toward the light source side. In this case, the total number of layers including the magneto-optical thin film and the metal reflection film is 38, which is equivalent to 57% of that of the aforementioned conventional example.

Figure 5:
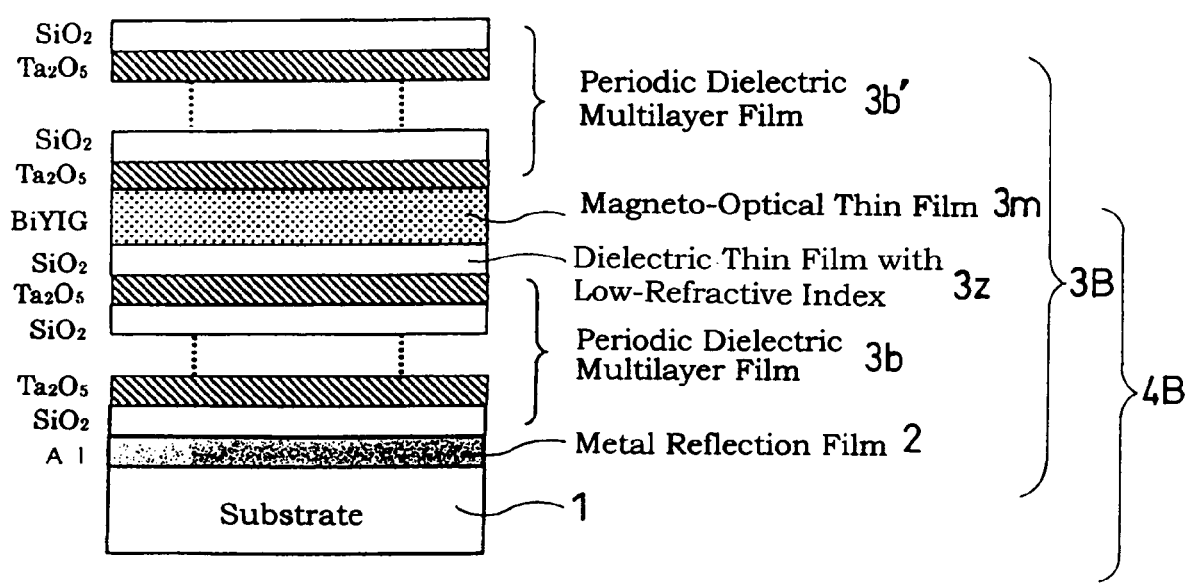
FIG. 5 shows a film configuration of a Faraday rotator according to a second embodiment of the present invention.

In a second embodiment of the present invention, as shown in FIG. 5, the Faraday rotator has a film configuration $(SiO_2/Ta_2O_5)^X/BiYIG/SiO_2/(Ta_2O_5/SiO_2)^X/Al$, where X denotes the number of repetition of bilayers constituting each of the periodic dielectric multilayer films. The difference from the first embodiment shown in FIG. 2 is that a dielectric thin film with a low refractive index having an optical length of $\lambda/4$ is provided between the magneto-optical thin film and the one periodic dielectric multilayer film located toward the metal reflection film. This dielectric thin film need not be identical with the lower-refractive index dielectric thin film constituting the periodic dielectric multilayer film, but workability improves if identical.

Figure 6:
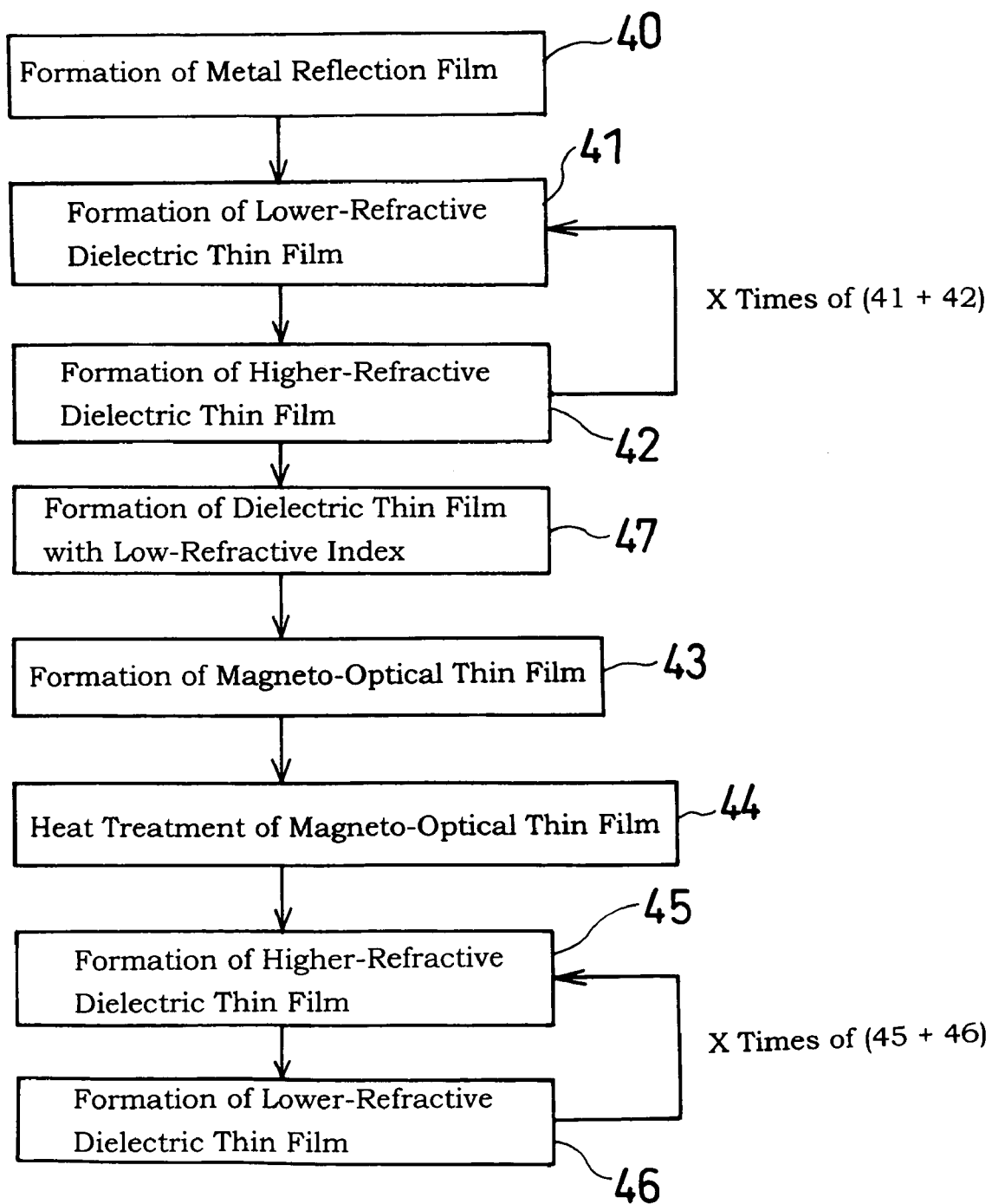
FIG. 6 shows a process of manufacturing the Faraday rotator according to the second embodiment of the present invention.

A process of manufacturing a Faraday rotator 4B shown in FIG. 5 is shown in FIG. 6. The difference from the process (FIG. 4) for the first embodiment is that an additional step (Step 47) is performed after the steps 41 and 42 and before the step 43. In the step 47, $SiO_2$ is formed as a dielectric thin film with a low refractive index 3z having an optical length of $\lambda/4$ on one periodic multilayer film 3b. The member produced by the process is cut to a predetermined size using a dicing machine, etc., thereby completing the Faraday rotator 4B.

Regarding the configuration of the Faraday rotator according to the second embodiment, X is specified to be 10 and thus each of the periodic dielectric multilayer films has 10 bilayers, and the dielectric thin film with a low refractive index 3z having an optical length of $\lambda/4$ is provided between the magneto-optical thin film 3m and the periodic dielectric multilayer film 3b located toward the metal reflection film 2. Therefore, the total number of layers is 43 including the magneto-optical thin film and the metal reflection film, which is greater by 5 than that of the first embodiment, but its outgoing light ratio (A) can be improved to 98% from 94% of the first embodiment without degrading the Faraday rotation angle. The remaining 2% of light is absorbed by the metal reflection film, with 0% returning toward the light source.

Figure 7:
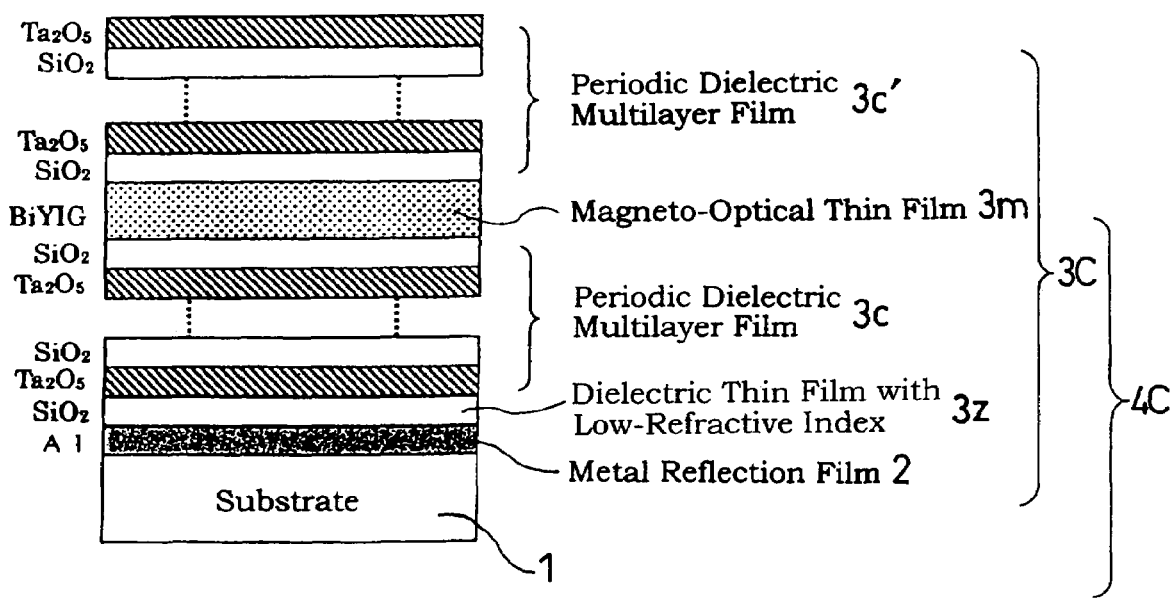
FIG. 7 shows a film configuration of a Faraday rotator according to a third embodiment of the present invention.

In a third embodiment of the present invention, as shown in FIG. 7, the Faraday rotator has a film configuration $(Ta_2O_5/SiO_2)^X/BiYIG/(SiO_2/Ta_2O_5)^X/SiO_2/Al$, where X denotes the number of repetition of bilayers constituting each of the periodic dielectric multilayer films. In the third embodiment, a key difference from the first embodiment shown in FIG. 2 is that periodic dielectric multilayer films 3c and 3c' are each configured such that $SiO_2$ as a lower-refractive dielectric thin film fronts BiYIG as a magneto-optical thin film 3m, and a key difference from the second embodiment shown in FIG. 5 is that a dielectric thin film with a low refractive index 3z having an optical length of $\lambda/4$ is provided between a metal reflection film 2 and the periodic dielectric multilayer film 3c located closer to the metal reflection film 2. This dielectric thin film need not be identical with the lower-refractive dielectric thin film constituting the periodic dielectric multilayer films, but workability improves if identical.

Providing the aforementioned difference from the first embodiment further reduces the total number of layers, and providing further the aforementioned difference from the second embodiment increases the outgoing light ratio.

Figure 8:
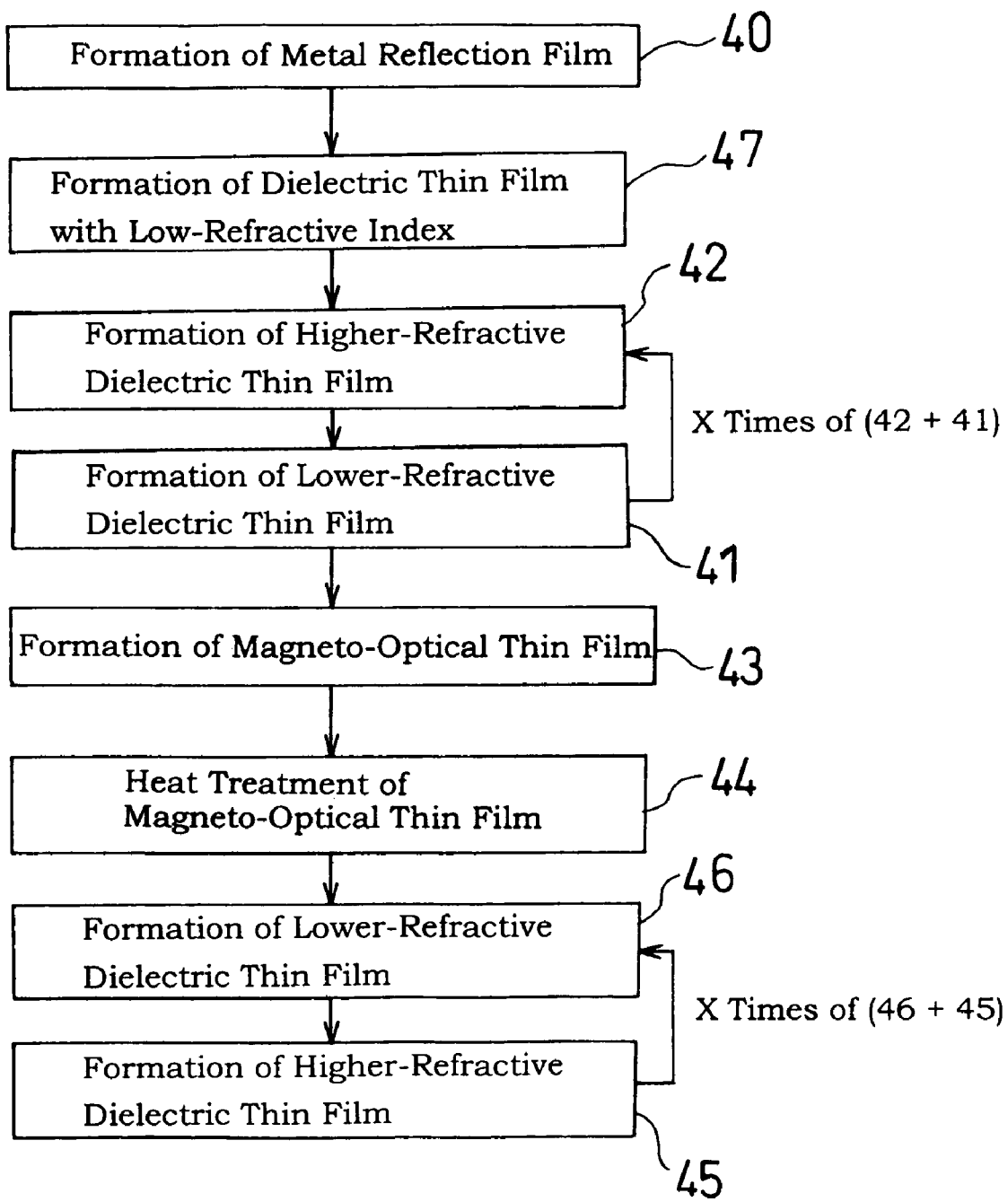
FIG. 8 shows a process of manufacturing the Faraday rotator according to the third embodiment of the present invention.

A process of manufacturing a Faraday rotator 4C shown in FIG. 7 will be described below with reference to FIG. 8. Aluminum (Al) is formed into a film with thickness of 100 nm or more on a substrate 1 (Step 40), thereby constituting the metal reflection film 2. Since light is reflected by Al of the metal reflection film 2, the substrate 1 does not have to be transparent. A dielectric thin film $SiO_2$ with a low refractive index 3z having an optical length of $\lambda/n$ (n: an integer) is formed on the metal reflection film 2 (Step 47). A higher-refractive dielectric thin film $Ta_2O_5$ having an optical length of $\lambda/4$ is formed on the dielectric thin film 3z taking the incidence angle of light into account (Step 42), and a lower-refractive dielectric thin film $SiO_2$ having an optical length of $\lambda/4$ is formed on the thin film $Ta_2O_5$ (Step 41). By conducting the steps 42 and 41 alternately X times each, one periodic dielectric multilayer film 3c of $(SiO_2/Ta_2O_5)^X$ as one reflecting mirror is produced.

Then, bismuth-substituted rare-earth iron garnet (BiYIG) constituting a magneto-optical thin film 3m having an optical length of $\lambda/2$ is formed on the one periodic dielectric multilayer film 3c (Step 43).

When the magneto-optical thin film 3m is formed of bismuth-substituted rare-earth iron garnet (BiYIG), it gets an amorphous structure at the step 43 and does not have magnetism, so a high-temperature heat treatment is performed (Step 44) so as to make crystallization happen.

Next, another periodic dielectric multilayer film 3c', that works as the other reflecting mirror, is formed on the magneto-optical thin film 3m in a reverse order to the steps 42 and 41 (Steps 46 and 45). To be specific, a lower-refractive dielectric thin film $SiO_2$ having an optical length of $\lambda/4$ is formed first (Step 46), then a higher-refractive dielectric thin film $Ta_2O_5$ having an optical length of $\lambda/4$ is formed thereon (Step 45). By conducting the steps 46 and 45 alternately X times each, the another periodic dielectric multilayer film 3c' of $(Ta_2O_5/SiO_2)^X$ is produced. The member produced by the aforementioned process is cut to a predetermined size using a dicing machine, etc., thereby completing the Faraday rotator 4C.

Figure 9:
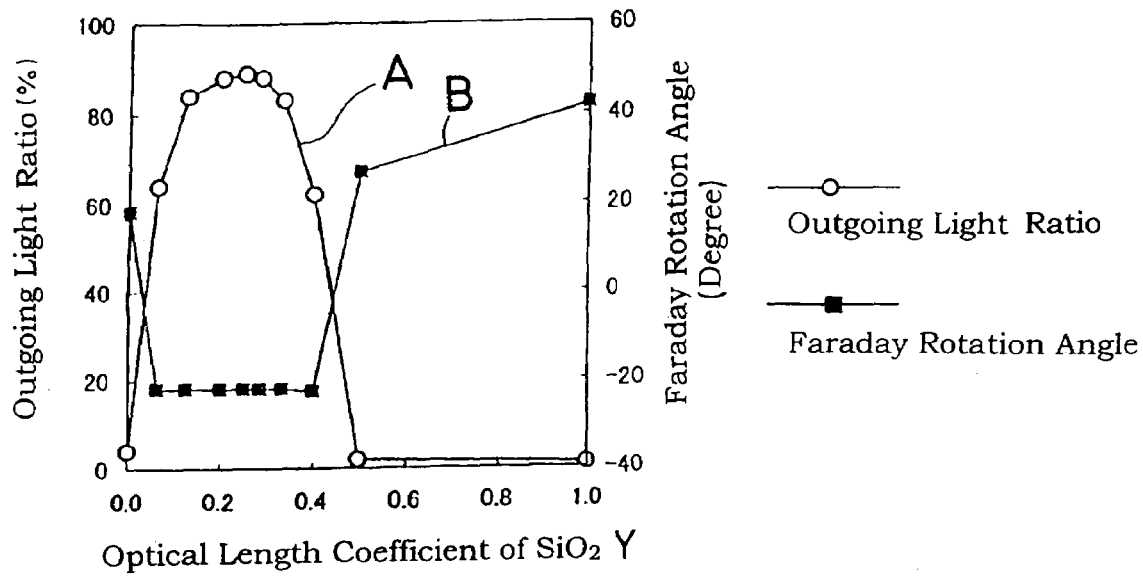
FIG. 9 shows an effect of the optical length of a dielectric thin film with a low refractive index on magneto-optical characteristics in the Faraday rotator according to the third embodiment.
Figure 10:
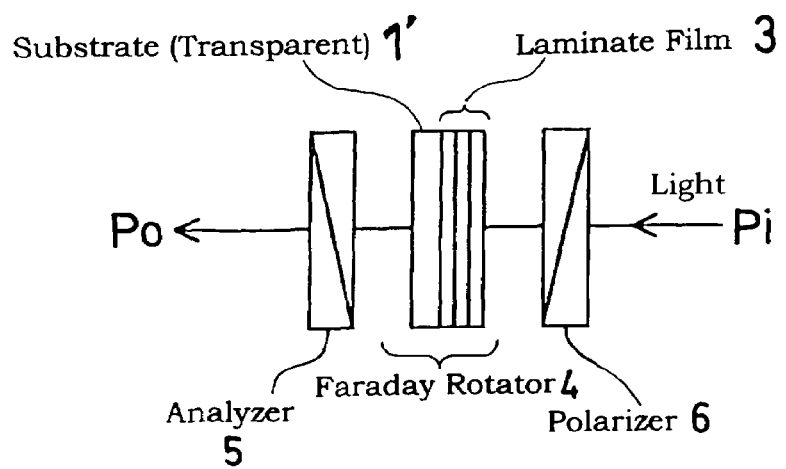
FIG. 10 shows a conventional optical isolator.

In FIG. 9, the left axis of ordinates indicates an outgoing light ratio (A), the right axis of ordinates indicates a Faraday rotation angle (B), and the axis of abscissas indicates the optical length coefficient (Y) (optical length=Y$\lambda$) of $SiO_2$ as the dielectric thin film with a low refractive index. When the number (X) is specified to be 6, and when $SiO_2$ as the dielectric thin film 3z provided between the metal reflection film 2 and the one periodic dielectric multilayer film 3c has an optical length ranging from $\lambda/8$ to $\lambda/3$, the outgoing light ratio (A) can be 80% or more, as is shown in FIG. 9. Although its outgoing light ratio is smaller than those of embodiments 1 and 2, 0% of light returns toward the light source thereby sufficiently functioning as an optical isolator.

In the first to third embodiments, incoming light is made incident on the Faraday rotator at a side opposite to a side where the substrate is located. However, incoming light may be made incident thereon at the substrate side. In this case, the films are formed in a reverse order to those in the embodiments, and the substrate must be transparent and provided with a non-reflective coating film, which prevents the irregularity of the metal reflection film accompanying the heat treatment of the magneto-optical thin film. Furthermore, even when some or all layers of the periodic dielectric multilayer film are formed of a magneto-optical thin film, a Faraday rotator can be configured with a reflective structure, which makes it possible to reduce the number of layers and to fine control the Faraday rotation angle.

The Faraday rotator according to the present invention essentially comprises a laminate film including at least one kind of magneto-optical thin film, and a metal reflection film formed on a top or bottom surface of the laminate film. Therefore, incoming light incident on the laminate film practically makes a round trip within the laminate film. As a consequence, a Faraday rotator of multilayer film type is realized which can exhibit excellent optical characteristics with reduced number of layers, and with only one magneto-optical thin film that needs a heat treatment. Furthermore, the light reflective structure eliminates light returning toward the light source, even when each of the layers constituting the laminate film is manufactured with an optical length deviating from a designed value.

In the Faraday rotator, preferably, the laminate film includes one magneto-optical thin film and two periodic dielectric multilayer films, in each of which two kinds of dielectric thin films having refractive index different from each other are alternately laminated, and is configured such that the two periodic dielectric multilayer films sandwich the magneto-optical thin film with their respective lamination patterns being symmetric with respect to the magneto-optical thin film, and the metal reflection film is formed on a surface of one periodic dielectric multilayer film of the two opposite to a surface fronting the magneto-optical thin film. Therefore, the total number of layers can be reduced to 57% of that of the conventional example.

In the Faraday rotator, preferably, the laminate film includes one magneto-optical thin film, two periodic dielectric multilayer films, in each of which two kinds of dielectric thin films having refractive index different from each other are alternately laminated, and a dielectric thin film having a low refractive index, and is configured such that the magneto-optical thin film is arranged between the two periodic dielectric multilayer films, and that the dielectric thin film having a low refractive index is formed on a top or bottom surface of one periodic dielectric multilayer film of the two located closer to the metal reflection film, and the metal reflection film is formed on a surface of the one periodic dielectric multilayer film opposite to a surface fronting the magneto-optical thin film. Furthermore, in the Faraday rotator, preferably, the dielectric thin film having a low refractive index is formed between the magneto-optical thin film and the periodic dielectric multilayer film arranged closer to the metal reflection film when the two periodic dielectric multilayer films are each configured such that a higher-refractive dielectric thin film of the two kinds fronts the magneto-optical thin film. Therefore, although the total number of layers is greater by 5 than that of the first embodiment, the outgoing light ratio can be improved to 98% from 94% of the first embodiment without degrading the Faraday rotation angle.

In the Faraday rotator, preferably, the dielectric thin film having a low refractive index is arranged between the metal reflection film and the periodic dielectric multilayer film located closer to the metal reflection film when the two periodic dielectric multilayer films are each configured such that a lower-refractive dielectric thin film of the two kinds fronts the maganeto-optical thin film. As a consequence, the total number of layers can be reduced.

In the Faraday rotator, preferably, the dielectric thin film with a low refractive index formed between the metal reflection film and the periodic dielectric multilayer film has an optical length ranging from $\lambda/8$ to $\lambda/3$ ($\lambda$: the wave length of light). As a consequence, the outgoing light ratio can be 80% or more.

What is claimed is:
1. A Faraday rotator having a structure of a Fabry-Perot resonator, comprising:
   a laminate film; and
   a metal reflection film formed on a top or bottom surface of the laminate film, wherein the laminate film includes one magneto-optical thin film and two dielectric multilayer films, in each of which two kinds of dielectric thin films having refractive index different from each other are alternately laminated in such a manner as to make a periodic formation, and is configured such that the two dielectric multilayer films sandwich the magneto-optical thin film with their lamination patterns being symmetric with respect to the magneto-optical thin film, each of the dielectric thin films has an optical length of about $\lambda/4$, where $\lambda$ is a wavelength of light, the metal reflection film is formed on a surface of one dielectric multilayer film of the two opposite to a surface fronting the magneto-optical thin film, the magneto-optical thin film is constructed in that an optical length of an irregular layer of the Fabry-Perot resonator is set to $\lambda/2$ or its integer multiples, and the dielectric multilayer films serve as a reflecting mirror of the Fabry-Perot resonator.

2. A Faraday rotator having a structure of a Fabry-Perot resonator, comprising:

a laminate film; and a metal reflection film formed on a top or bottom surface of the laminate film, wherein the laminate film includes one magneto-optical thin film, two dielectric multilayer films, in each of which two kinds of dielectric thin films having refractive index different from each other are alternately laminated in such a manner as to make a periodic configuration, and a dielectric thin film having a low refractive index, and is configured such that the magneto-optical thin film is arranged between the two dielectric multilayer films, and that the dielectric thin film having a low refractive index is arranged on a top or bottom surface of one dielectric multilayer film of the two located closer to the metal reflection film, each of the dielectric thin films has an optical length of about $\lambda/4$, where $\lambda$ is a wavelength of light, the metal reflection film is formed on a surface of the one dielectric multilayer film opposite to a surface fronting the magneto-optical thin film, the magneto-optical thin film is constructed in that an optical length of an irregular layer of the Fabry-Perot resonator is set to $\lambda/2$ or its integer multiples, and the dielectric multilayer films serve as a reflecting mirror of the Fabry-Perot resonator.

3. A Faraday rotator according to claim 2, wherein the dielectric thin film having a low refractive index is arranged between the magneto-optical thin film and the one periodic dielectric multilayer film located closer to the metal reflection film when the two periodic dielectric multilayer films are each configured such that a higher-refractive dielectric thin film of the two kinds fronts the magneto-optical thin film.

4. A Faraday rotator according to claim 2, wherein the dielectric thin film having a low refractive index is arranged between the metal reflection film and the one periodic dielectric multilayer film located closer to the metal reflection film when the two periodic dielectric multilayer films are each configured such that a lower-refractive dielectric thin film of the two kinds fronts the magneto-optical thin film.

5. A Faraday rotator according to claim 4, wherein the dielectric thin film having a low refractive index arranged between the metal reflection film and the periodic dielectric multilayer film has an optical length ranging from $\lambda/8$ to $\lambda/3$.

6. A Faraday rotator according to claim 2, wherein the Fabry-Perot resonator has no trade-off relationship between a Faraday rotation angle and light transmittance.

7. A Faraday rotator according to claim 1, wherein the Fabry-Perot resonator has no trade-off relationship between a Faraday rotation angle and light transmittance.

* * * * *